United States Patent [19]

Glew et al.

[11] Patent Number: 5,314,598
[45] Date of Patent: May 24, 1994

[54] ELECTROCHEMICAL BROACHING APPARATUS

[75] Inventors: Derek A. Glew; Alan D. Staines, both of Bristol; Alan J. Cannon, Chepstow; Roger N. Dunlop, Bristol, all of Great Britain

[73] Assignee: Rolls Royce PLC, England

[21] Appl. No.: 927,490

[22] PCT Filed: Feb. 6, 1992

[86] PCT No.: PCT/GB92/00229

§ 371 Date: Sep. 29, 1992

§ 102(e) Date: Sep. 29, 1992

[87] PCT Pub. No.: WO92/13667

PCT Pub. Date: Aug. 20, 1992

[30] Foreign Application Priority Data

Feb. 7, 1991 [GB] United Kingdom ............... 9102671

[51] Int. Cl.$^5$ .................. B23H 3/00; B23H 3/04; B23H 7/26
[52] U.S. Cl. .................. 204/224 M; 204/225; 204/284
[58] Field of Search ........... 204/129.1, 129.43, 129.7, 204/DIG. 7, 224 M, 225, 290 R, 284

[56] References Cited

U.S. PATENT DOCUMENTS 3,305,470  2/1967  Williams et al. .......... 204/224 M X
3,372,099  3/1968  Clifford .................. 204/225 X
3,723,268  3/1972  Johns et al. ............. 204/129.1
3,847,781  11/1974 Bellows .................. 204/284 X
3,875,038  4/1975  McKinney et al. ......... 204/224 M

FOREIGN PATENT DOCUMENTS 1255930 12/1971 United Kingdom.

OTHER PUBLICATIONS

Patent Abstracts of Japan, vol. 6, No. 232 (M-172)[1110], Nov. 18, 1982; & JP, A, 57132949 (Tokyo Shibaura Denki K.K.) Aug. 17, 1982.

*Primary Examiner*—Donald R. Valentine
*Attorney, Agent, or Firm*—Oliff & Berridge

[57] ABSTRACT

A method of electrochemically machining a workpiece made of electrically conductive material so as to provide a radius on an edge of the workpiece comprises, (a) providing a cathodic tool comprising a cathode section sandwiched between two anode sections and separated therefrom by insulation, (b) locating the tool adjacent to but separate from the workpiece so that the cathode section is positioned centrally over the edge of the workpiece to be radiused and the anode sections lie facing opposite sides of the edge, (c) causing electrolyte to flow between the tool and the workpiece, (d) applying a cathodic voltage to the cathode section, (e) applying preselected anodic voltages simultaneously to the workpiece and the anode sections so that electrical field null points between the cathodic tool and the workpiece lie either side of the edge to be radiused, and (f) varying the electrical field between the tool and the workpiece so as to cause the null points in the electrical field to move with respect to each other and said edge of the workpiece to ensure an overall energy distribution across said edge to create the radius required.

10 Claims, 8 Drawing Sheets

ELECTROCHEMICAL BROACHING APPARATUS

This invention concerns improvements in or relating to electrochemical machining, and in particular relates firstly to an improved method of using an electrochemical machining operation to shape an edge of an electrically conductive component, and secondly to provide precision broaching of metal and alloy components. A specific embodiment of the invention contemplates shaping said edge so as to provide a radius thereon.

The principles and general techniques of electrochemical machining are well known and are described in, for example, U.S. Pat. No. 3,723,268 (assigned to Production Engineering Research Association of Great Britain), to which the reader is referred.

Generally, the present invention provides in a first aspect a method of shaping an edge of an anodic workpiece in an electrochemical machining operation by controlling the intensity of the electrical field in the electrolyte adjacent said edge, in a second aspect an electrochemical broaching apparatus for making a channel in a workpiece, and in a third aspect a method of supplying electrolyte to a electrochemical machining tool in a broaching operation.

According to a first aspect of the present invention there is provided a method of electrochemically machining a workpiece made of electrically conductive material so as to provide a radius on an edge of the workpiece, the method comprising, (a) providing a cathodic tool comprising a cathode section sandwiched between two anode sections and separated therefrom by insulation, (b) locating the tool adjacent to but separate from the workpiece so that the cathode section is positioned centrally over the edge of the workpiece to be radiused and the anode sections lie facing opposite sides of the edge, (c) causing electrolyte to flow between the tool and the workpiece, (d) applying a cathodic voltage to the cathode section, (e) applying preselected anodic voltages simultaneously to the workpiece and the anode sections so that electrical field null points between the cathodic tool and the workpiece lie either side of the edge to be radiused, and (f) varying the electrical field between the tool and the workpiece so as to cause the null points in the electrical field to move with respect to each other and said edge of the workpiece to ensure an overall energy distribution across said edge, thereby to create the radius required.

According to a second aspect of the present invention there is provided an electrochemical broaching apparatus comprising an electrolyte bath, a first end wall of which is provided by a workpiece of electrically conductive material to be broached, an elongate broaching tool, an elongate horizontally disposed support member adapted to carry underneath it the broaching tool, the workpiece providing the anode of an electrochemical broaching operation and the broaching tool providing the cathode of the electrochemical broaching operation, wherein the support member is arranged to be supported by a second end wall of the bath opposed to the first end wall and to be moved in its elongate direction over the bath and over the workpiece, and the broaching tool is of a wedge shape, the narrow end of which is near the first end wall at the start of the broaching operation and the remainder of which is immersed in the electrolyte bath.

According to a third aspect of the present invention there is provided for use in an electrochemical machining operation a broaching tool for making an aperture in an anodic workpiece, the tool being provided with at least one cathodic portion and characterised in that at least two portions of the tool are provided with mutually independent means for supplying electrolyte to the tool.

The invention will now be described by way of example with reference to the accompanying diagrammatic non-scale drawings in which.

Figure 1:
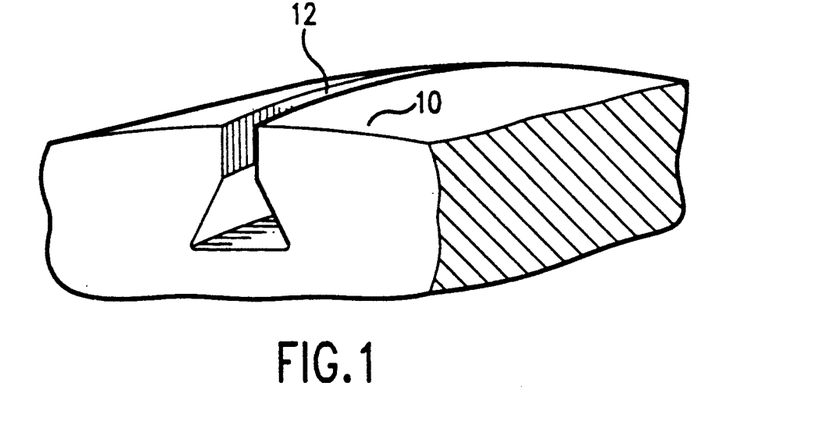
FIG. 1 is a perspective view of a dovetail slot in a rotor disc of a gas turbine engine. Such a slot is used for locating engine compressor and turbine blades in the disc.

Referring to FIG. 1 there is shown a portion of a rotor disc 10 for a gas turbine engine; there is shown one of a number of dovetail grooves 12 spaced round the periphery of the disc and extending from one face to the other. The disc 10 may for example be made of a nickel based alloy, a titanium based alloy, or titanium metal composites. The disc 10 is but one example of many components or workpieces suitable for treatment by electrochemical machining or broaching techniques, and provides the anode of the electrochemical machining/broaching operation of the present invention.

The electrolyte envisaged in the operation of the invention may, for example, be sodium chloride based in the case of titanium based alloys, or sodium nitrate based in the case of nickel based alloys In either case, the electrolyte may contain additives to enhance surface finish of the final product Other materials may require other electrolytes.

FIGS. 2 and 5–9 show various views of an electrochemical broaching tool 14 (the cathode of the operation) for producing the grooves 12 in the anodic disc 10. The broaching tool 14 is of a wedge shape and comprises a number of sections as follows.

Figure 2:
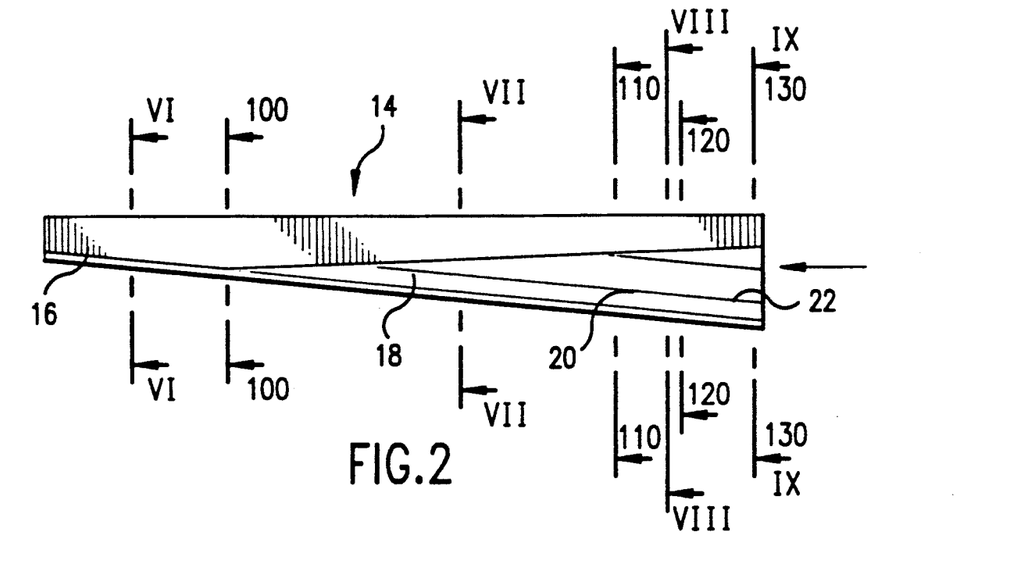
FIGS. 2, 3 and 4 are respectively left-hand, middle, and right-hand segments in longitudinal section of an electrochemical broaching tool for making the slot shown in FIG. 1. Left-hand and right-hand are to be read with respect to the drawings.

The initial section 16 to position 100—100 is designed to achieve two functions: rapid engagement of the tool 14 along the complete cut length, achieved by a shallow approach angle, e.g. 5°, followed by a steepening of approach angle over the second section 18 between 100—100 to 110—110, e.g. 10°, in order to optimise metal ionisation volumes in terms of tool feed rate and areas engaged. This is followed by the third section 20 from 110—110 to 120—120 with an approach angle embracing all surfaces of the two dimensional form still typically at an angle of 10°.

Feed rate, voltage and electrolyte conductivity are adjusted such that a minimum machining gap is achieved along the lengths of the cut commensurate with the electrolyte flow limitations and maximising ionisation rates for the bulk metal removal.

The fourth section 22 of the tool from 120—120 to 130—130 is relatively short compared with the preceding sections and is angled more steeply, typically between 15°-20° to effect progressively and over a short flow path length a significant reduction in the local machining gap width as the final envelope is removed from the component to produce the desired shape and size of aperture in the component. This fourth section of the tool provides the precision of a finishing cut and the accurate reproduction of the final geometry of the tool. The mean ionising voltage gradients above the anode surface of the disc 10 when it is being machined by this final section of the tool are targeted at between 600-1200 volts/cm. This ensures that the differences in ionisation rates due to the different dissociation voltages of the varying material phases in the alloy of the anodic disc 10 do not give rise to significant micro level electrochemical machining gap variations, and results in a smooth surface finish.

Figure 3:
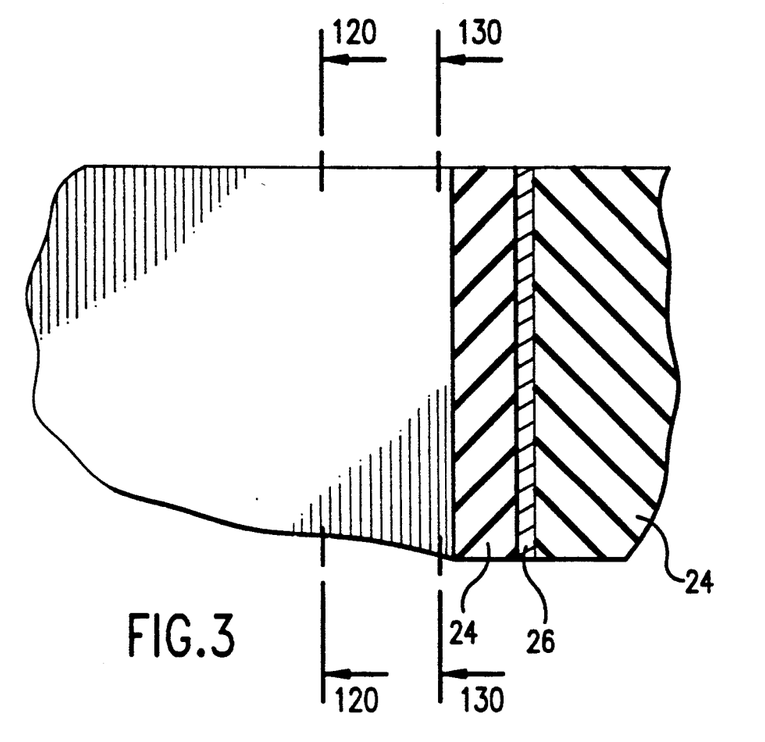

Immediately following 130—130, FIG. 3, is a short parallel insulation stage 24 sandwiching a charged anode 26 enveloping the full two dimensional shape thereby providing protection from "stray machining" to the component from point 130—130 onwards. The problem of "stray machining" and attempts to solve it are described in U.S. Pat. No. 3,723,268. This protection ensures that no deterioration in surface finish or accuracy is permitted to occur. Charged anode voltage levels used are typically between 2-10 volts above the anodic potential of the workpiece, depending on materials, gap geometry and the machining cut-off point required.

Figure 4:
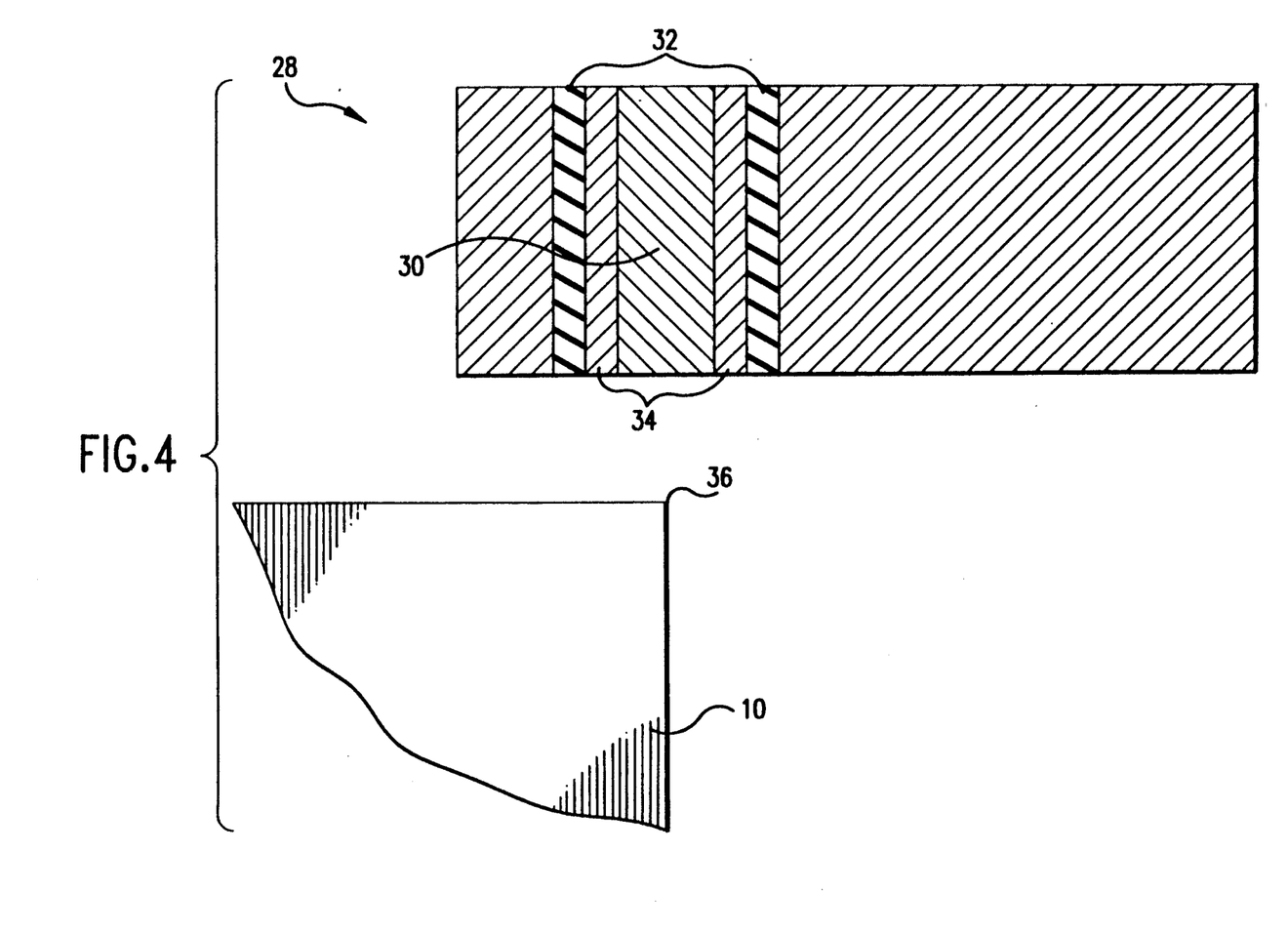
Figure 5:
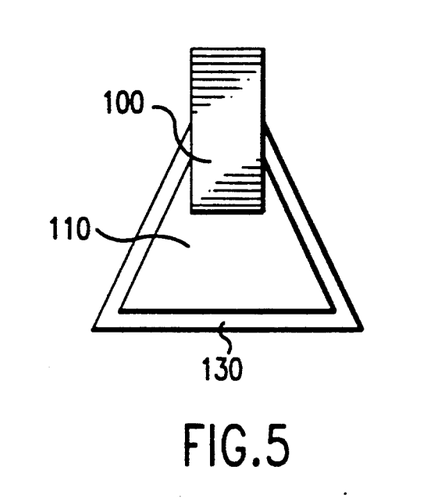
FIG. 5 is an end view of the tool of FIG. 2 taken in the direction of arrow V.
Figure 6:
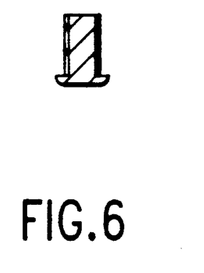
FIGS. 6–9 are cross sections of the tool of FIG. 2 taken at lines VI—VI, VII—VII, VIII—VIII and IX—IX respectively.
Figure 7:
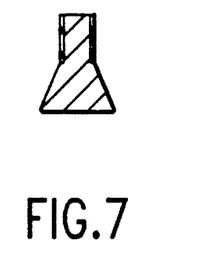
Figure 8:
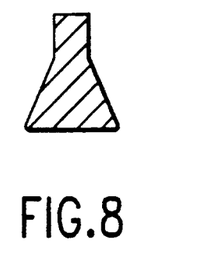
Figure 9:
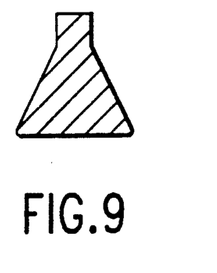
Figure 10:
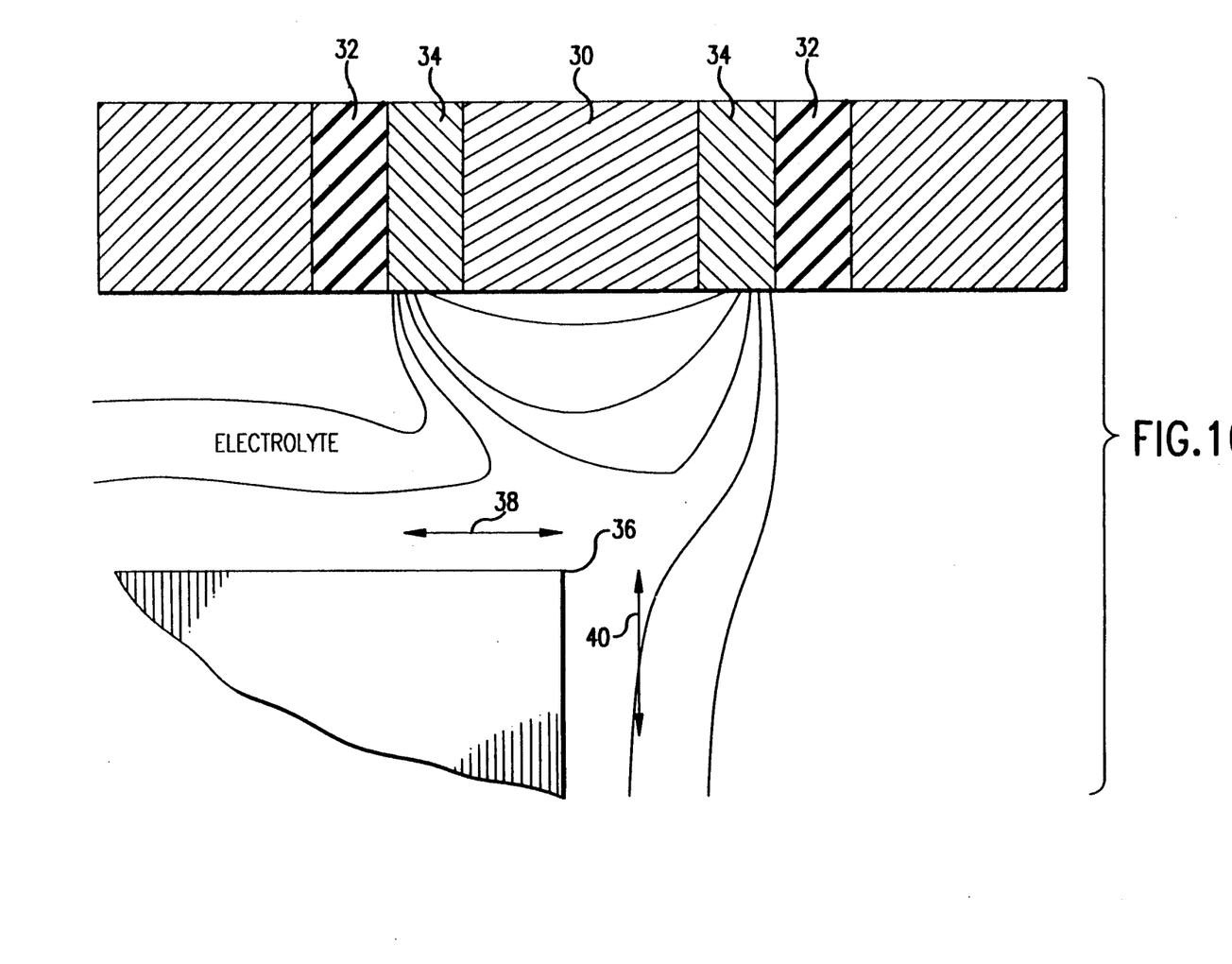
FIG. 10 shows the use of the broaching tool of FIGS. 2-4 in radiusing an edge of a workpiece.

The final section 28 of the tool, shown in FIGS. 4 and 10, is for edge radiusing at the front and rear faces of the form produced. It comprises a cathode section 30 sandwiched between adjacent charged anode sections 32 and insulated from the anode sections by insulation 34. In FIG. 10 there is shown the electric field density between the final section 28 of the tool and an edge 36 of the workpiece 10. In the electric field near the edge 36 there are "null" points 38, 40 at which the workpiece 10 is either anodic to the tool surface or is cathodically protected. Radiusing is effected by one of the three following embodiments of the present invention.

In the first embodiment the cathode section 30 is preset through machine control to a nominal position centrally over the edge 36, with electrolyte flowing between the surfaces. Voltages of preset peak values are applied simultaneously to the workpiece 10 and the charged anode sections 32. The voltages on the anode sections 32 are controlled by electronic means (not shown) such that their values are cycled between just above the voltage of the workpiece 10 and the preset peak values, thereby moving the null points 38, 40 backwards and forwards across the edge 36 being radiused The period of the cycle is set to ensure an overall energy distribution across the edge 36 to create the radius required and the necessary smooth blends into adjacent surfaces.

In the second embodiment the cathode 30 is preset through machine control to a nominal position centrally over the edge 36 to be radiused, with electrolyte flowing between the surfaces. Preset voltages are applied simultaneously to the workpiece 10 and the charged anode sections 32. The voltages on the charged anode sections 32 are then progressively reduced in value to a level just exceeding that of the anode workpiece. This permits the null points 38, 40 to move apart thereby enabling the edge 36 to be radiused and blended into controlled surfaces at a controlled rate.

In these first two embodiments varying voltage values on the charged anode sections 32 relative to the anode voltage of the workpiece 10 move polarity transition points on the workpiece surface, thereby controlling ionisation across the edge profile.

In the third embodiment the cathode 30 is preset through machine control to a nominal position centrally over the edge 36 to be radiused, with electrolyte flowing between the surfaces. Preset anodic voltages are applied simultaneously to the workpiece 10 and the charged anode sections 32 such that the electrical field null points 38, 40 at the anodic workpiece surface are to either side of and immediately adjacent the edge 36 to be radiused. The cathode 30 is then indexed rapidly in forward and reverse to a preset cycle such that the period of the cycle is set to ensure an overall energy distribution across the edge to create the radius required and the necessary blends into adjacent surfaces. Axial tool movement, forward and reverse, moves polarity transition points on the workpiece surface, thereby controlling ionisation across the edge profile.

On completion of the radiusing the tool is indexed clear of the workpiece (by means not shown) for the next cycle.

The manufacture of linear broaching tools for electrochemical machining may utilise conventional numerical control techniques, programmed to produce the required face angles on each segment of tooling. The individual tool sections are located and clamped into a common carrier thereby making up the composite tool. High conductivity copper alloys form the main tool body. The non-conducting, insulated portions are typically in glass reinforced plastic laminate and the charged anode material in a suitably electro-corrosive resistant alloy material, typically platinum rhodium alloy.

Flow inlet and outlet passages and restrictors are suitably positioned as dictated by the profile geometry. These either direct the flow longitudinally along the broaching tool between discrete inlet and outlet slots, or alternatively are sited along a lower tool surface to flow the electrolyte radially across the tool flanks. To achieve entry, exit and final shape criteria a tool generally requires a combination of such flow geometries. Ways of achieving these aims are shown in FIGS. 11-17.

Figure 11:
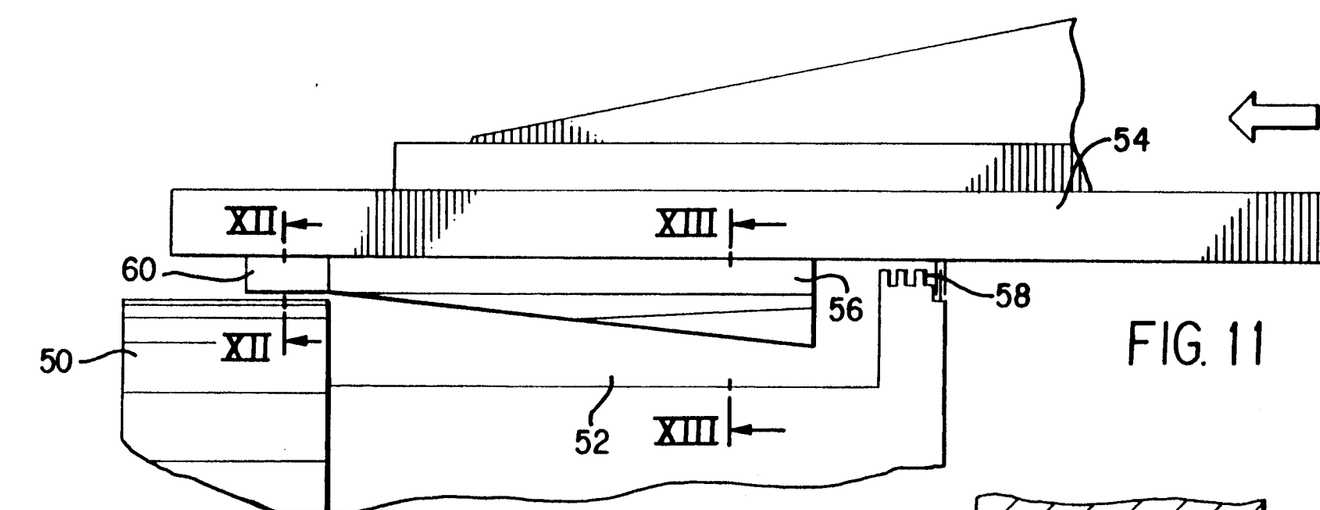
FIG. 11 is a longitudinal cross section through an apparatus for applying the broaching tool of FIGS. 2-4 to a rotor disc of a gas turbine engine.

In FIG. 11 an electrochemical broaching apparatus for broaching an anodic workpiece 50 of electrically conductive material comprises an electrolyte bath 52, a first end wall of which is provided by the workpiece. An elongate horizontally disposed tool support member 54 extends over the bath 52 from a second end wall opposite the workpiece 50 to the workpiece itself.

The electrolyte bath 52 is provided with an electrolyte supply inlet (not shown) and an outlet (not shown) to remove spent electrolyte, so that there is a continuous supply of fresh electrolyte to the bath.

The member 54 carries underneath it an elongate broaching tool 56 which provides the cathode of the electrochemical broaching operation. Sealing between the support member 54 and the second end wall is provided by a labyrinth and brush seal arrangement 58. The support member 54 is able to be moved, by means of a motor arrangement (not shown) in its elongate direction over the bath 52 and over the workpiece 50.

Figure 12:
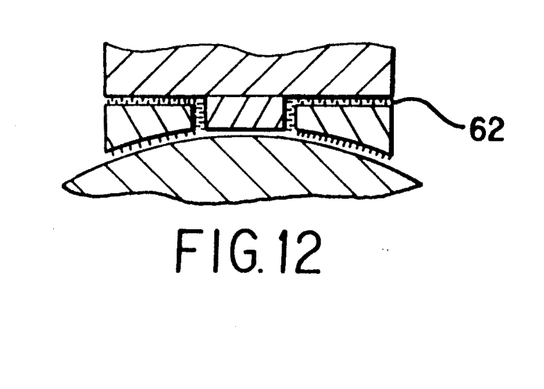
FIGS. 12 and 13 are sections through the apparatus of FIG. 11 taken at lines XII—XII and XIII—XIII respectively.
Figure 13:
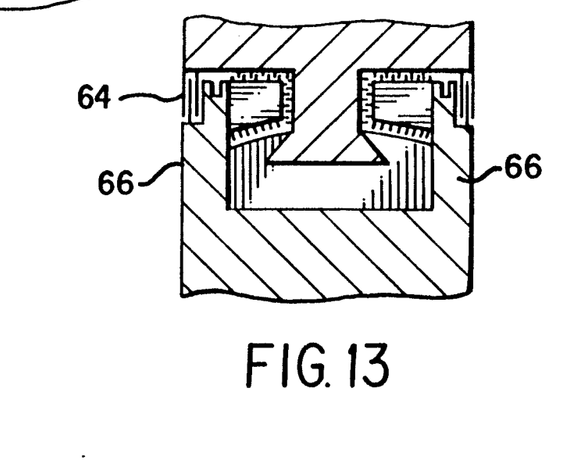

The broaching tool 56 is of wedge shape and is of the general construction described above with reference to FIGS. 2-10. The narrow end of the tool is provided by a lead-in insulated dummy section 60 which slides on top of the workpiece 50. As shown in FIG. 12, which is a section at XII—XII of FIG. 11, sealing in this region is provided by brush seals 62. The remainder of the broaching tool 56 is immersed in the electrolyte in the bath 52. As shown in FIG. 13, which is a section at XIII—XIII of FIG. 11, brush and labyrinth seals 64 are provided between side walls 66 of the bath 52 and the support member 54.

A second arrangement for supplying electrolyte to the bath 52 is shown in FIGS. 14, 14a, 15, and 15a. Here, as in the previous arrangement, brush seals 68 are provided the full length of the broaching tool 56 (FIG. 15), as well as at the front of the dummy section 60, and restrictor plates 70 (FIG. 15a) are provided to ensure low electrolyte pressure downstream.

Electrolyte flow through the broaching tool 56 is provided by passages 72, 73, 74, 75, 76 located in the tool and extending into the electrolyte bath area between successive sections of the tool analogous to sections 18-22 described above with reference to FIGS. 2-10. Passage 72 extends through the lead-in dummy section 60. The final passage 76 is immediately downstream of a steeply inclined section 77 analogous to, and fulfilling the same purpose as, section 22 described above. Each passage 72-76 is provided with a valve mechanism (not shown) whereby each passage may individually be an electrolyte inlet, an outlet for spent electrolyte, or be closed off, depending on the stage the tool has reached in the broaching of the workpiece.

Figure 14:
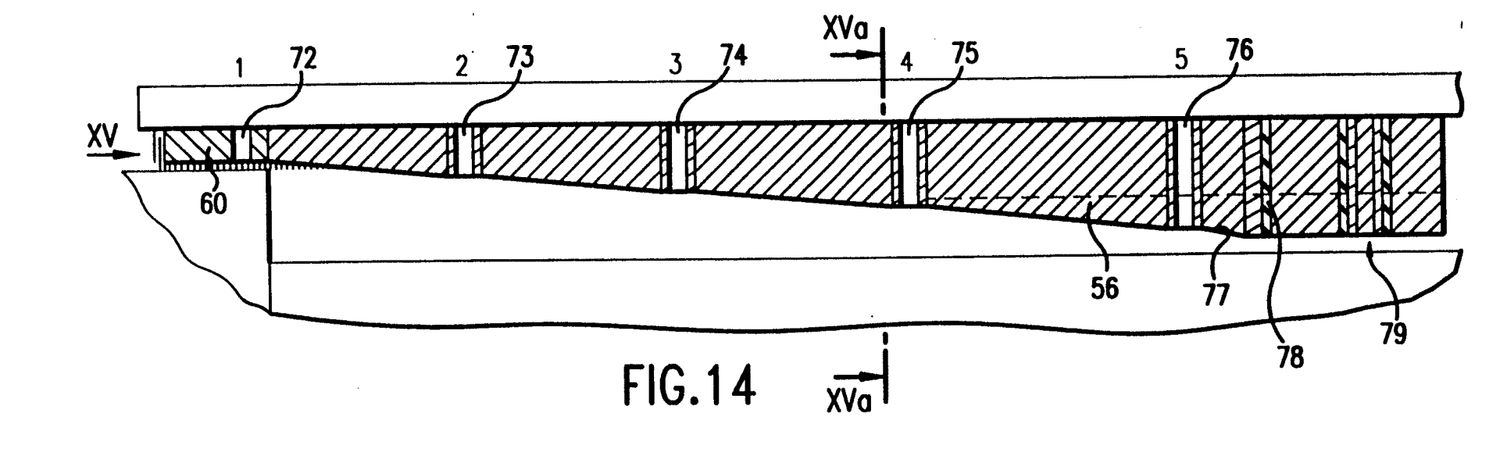
FIG. 14 is a longitudinal section through a further embodiment of a broaching tool according to the invention, incorporating electrolyte flow passages in the tool.

Upstream of section 77 on the tool 56 is an anodic charged sleeve 78 for cathodic workpiece protection, and upstream of sleeve 78 is an edge radiusing mechanism 79 as described above with reference to FIG. 10.

The direction of electrolyte flow through the passages 72-76 will now be described with reference to FIG. 14a which is a graphical representation of the status of each passage during a broaching operation.

Figure 14A:
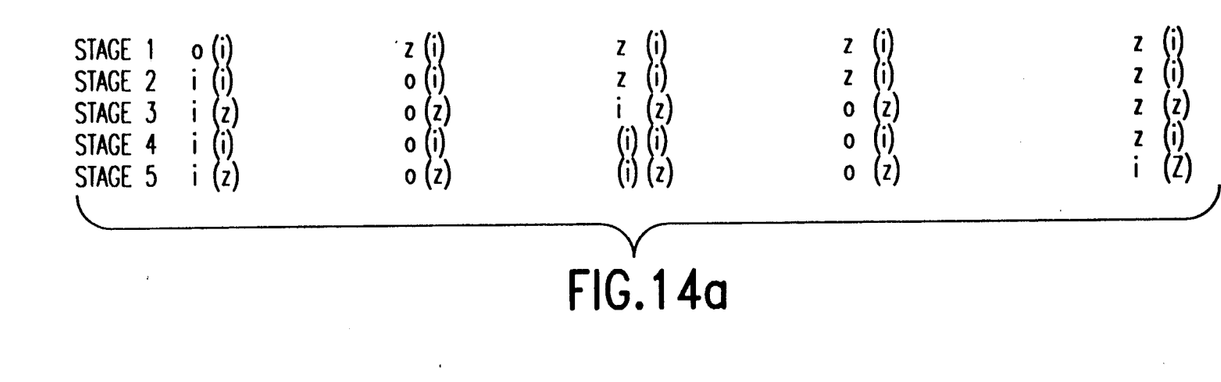
FIG. 14a is a graph showing the direction of flow through the flow passages of FIG. 14 at various stages in the operation of the apparatus.
Figure 15:
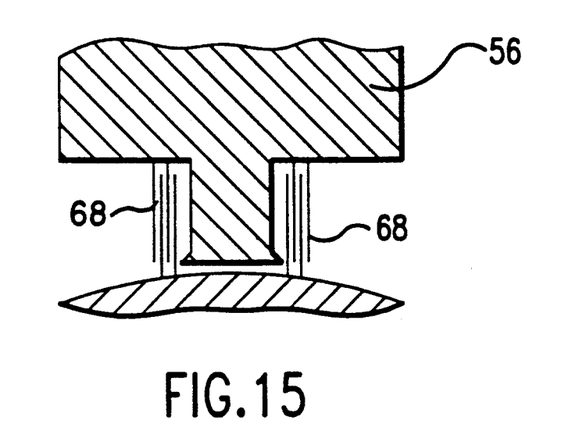
FIG. 15 is an end view of the tool of FIG. 14 taken in the direction of arrow XV.
Figure 15A:
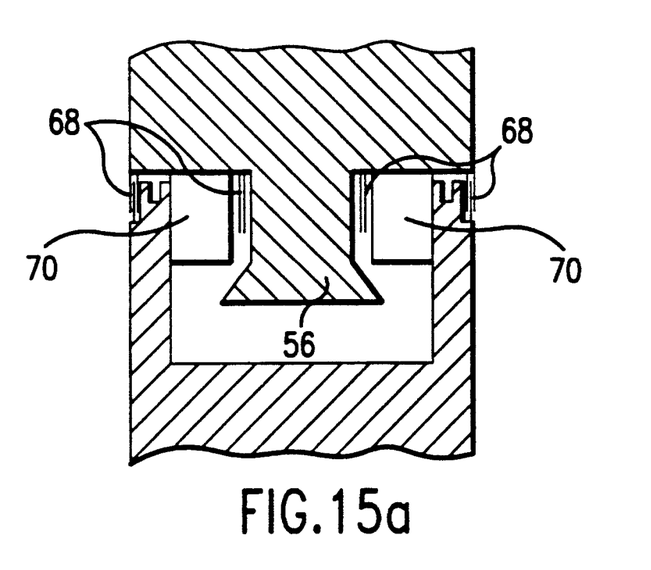
FIG. 15a is a cross section through the apparatus of FIG. 15 taken at line XVa—XVa.

In FIG. 14(a), "o" signifies that the passage concerned is an outlet; "i" signifies that the passage is an inlet; and "z" (zero pressure) that the passage is closed. Letters in parentheses ("i" or "z") indicate whether the electrolyte bath is respectively pressurised or not.

Stage 1: The lead-in insulated dummy section 60 is located over the workpiece 50. Passage 72 is an outlet; the remaining passages are closed; the bath is pressurised with electrolyte.

Stage 2: The tool has progressed so that flow passage 73 is over the workpiece 50. Passage 72 is an inlet; passage 73 is an outlet; passages 73-76 are closed; the bath is pressurised.

Stage 3: The tool has progressed so that flow passage 74 is over the workpiece 50. Passage 72 is an inlet; passage 73 is an outlet; passage 74 is an inlet; passage 75 is an outlet; passage 76 is closed; the bath is not pressurised.

Stage 4: The tool has progressed so that flow passage 75 is over the workpiece 50. Passage 72 is an inlet; passage 73 is an outlet; passage 74 is an inlet; passage 75 is an outlet; passage 76 is closed; the bath is pressurised.

Stage 5: The tool has progressed so that flow passage 76 is over the workpiece 50. Passage 72 is an inlet; passage 73 is an outlet; passage 74 is an inlet; passage 75 is an outlet; passage 76 is an inlet; the bath is not pressurised.

Following these stages, the tool is advanced so as to carry out the radiusing of the edges of the broached aperture now formed in the workpiece, as described with reference to FIG. 10.

Figure 16:
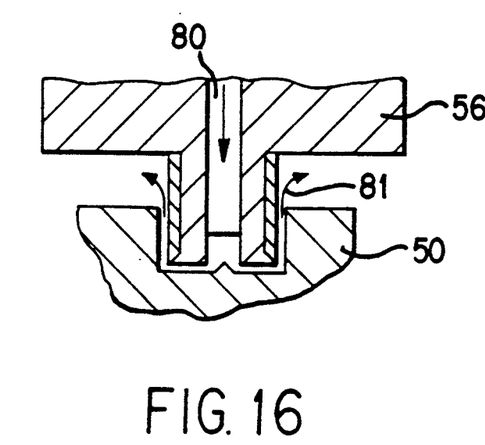
FIGS. 16, 17 are cross sections through an alternative design of broaching tool.
Figure 17:
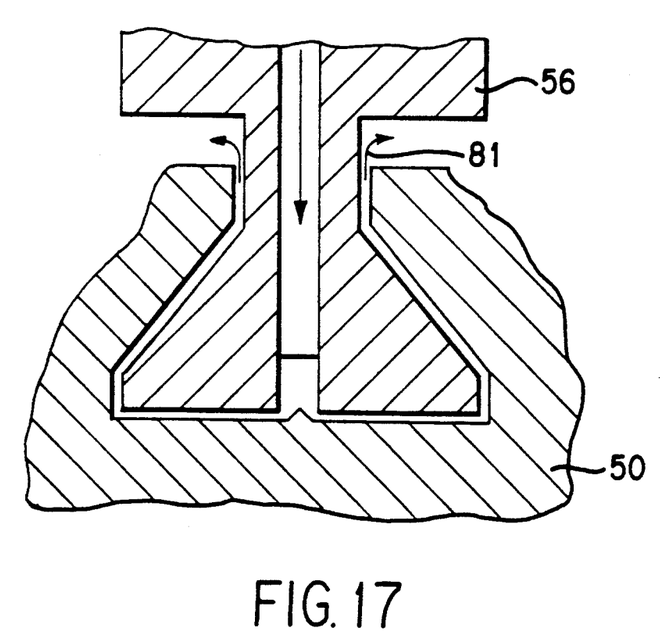

FIGS. 16 and 17 show a third arrangement for supplying electrolyte to the broaching tool 56. FIG. 16 shows a cross section through a first section of the tool when it is progressing into the workpiece 50; and FIG. 17 shows a cross section through a later section of the tool when it is progressing into the workpiece. Here, each section of the tool has its independent electrolyte supply which pumps electrolyte down a passage 80 through the tool into the working area of the workpiece 50 as the tool progresses into the workpiece. The electrolyte leaves the working area between the sides of the tool and the sides of the broached aperture in the workpiece, as indicated by arrows 81.

The invention demonstrates that the process capability of electrochemical machining can be improved so that operations requiring the precision of broaching are feasible on two dimensional profiles. Furthermore, a surface finish and roughness standards on titanium based alloys, nickel based alloys and titanium metal composites can be attained which are the equal of the equivalent metal cutting action.

The invention eliminates the need for deburring and radiusing of edges as a separate operation by combining both machining and edge radiusing into a single process, thereby effecting significant cost savings.

The invention further enables workpieces to be broached in substantially less time than would be taken by equivalent mechanical procedures. A time saving of up to 75% or better may be achieved.

We claim:

1. An electrochemical broaching apparatus comprising: (a) a bath adapted for holding an electrolyte, the bath having first and second end walls, the first end wall being provided by a workpiece of electrically conductive material to be broached, (b) an elongate broaching tool, and (c) an elongate horizontally disposed support member adapted to carry underneath it the broaching tool, the workpiece providing the anode of an electrochemical broaching operation and the broaching tool having at least one cathodic portion providing the cathode of the broaching operation, wherein the support member is arranged to be supported by the second end wall and to be moved in its elongate direction over the bath and over the workpiece, one end of the broaching tool being near the first end wall at the start of the broaching operation and the remainder of the tool being arranged for immersion when said electrolyte is present in the bath.

2. An apparatus as claimed in claim 1, wherein at least two portions of the broaching tool are provided with mutually independent means for supplying electrolyte to the tool.

3. An apparatus as claimed in claim 1, wherein the broaching tool is wedge-shaped in its elongate direction, being adapted to broach a slot in the workpiece, said one end of the tool being the narrow end of the wedge.

4. An apparatus as claimed in claim 3, wherein the wedge is provided by a plurality of sections extending from the narrow end of the opposed end of the wedge, the angle of the wedge increasing in stages corresponding to successive sections.

5. An apparatus as claimed in claim 4, wherein the angle of the first wedge section is about 5° and the angle of the final section is 15°–20°.

6. An apparatus as claimed in claim 4, wherein passages are provided in the broaching tool extending through the tool into the bath, each passage being located between respective successive sections of the tool and being adapted to provide a flow of electrolyte through the tool.

7. An apparatus as claimed in claim 5, wherein each passage is provided with valve means whereby each passage may be a passage for electrolyte, spent electrolyte, or may be closed.

8. An apparatus as claimed in claim 4, wherein the narrow end of the tool is provided by a lead-in insulated dummy section preceding the first section.

9. An apparatus as claimed in claim 4, wherein an anodic charged sleeve is provided upstream of the final section of the tool for cathodic workpiece protection.

10. An apparatus as claimed in claim 9, wherein there is provided upstream of the anodic charged sleeve an edge radiussing means comprising a cathode section sandwiched between and insulated from adjacent anode sections.

* * * * *